United States Patent
Masuda (10) Patent No.: US 9,905,829 B2
(45) Date of Patent: Feb. 27, 2018

(54) ENERGY STORAGE APPARATUS

(71) Applicant: GS Yuasa International Ltd., Kyoto-shi (JP)

(72) Inventor: Noriaki Masuda, Kyoto (JP)

(73) Assignee: GS YUASA INTERNATIONAL LTD., Kyoto-Shi, Kyoto (JP)

( * ) Notice: Subject to any disclaimer, the term of this patent is extended or adjusted under 35 U.S.C. 154(b) by 549 days.

(21) Appl. No.: 14/488,924

(22) Filed: Sep. 17, 2014

(65) Prior Publication Data
US 2015/0086844 A1 Mar. 26, 2015

(30) Foreign Application Priority Data

Sep. 24, 2013 (JP) .................... 2013-197535
Aug. 11, 2014 (JP) .................... 2014-163275

(51) Int. Cl.
| | | |
|---|---|---|
| *H01M 2/20* | (2006.01) | |
| *H01M 2/22* | (2006.01) | |
| *H01G 11/10* | (2013.01) | |
| *H01G 11/24* | (2013.01) | |
| *H01G 11/74* | (2013.01) | |
| *H01M 2/30* | (2006.01) | |

(52) U.S. Cl.
CPC ............ *H01M 2/204* (2013.01); *H01G 11/10* (2013.01); *H01G 11/24* (2013.01); *H01G 11/74* (2013.01); *H01M 2/206* (2013.01); *H01M 2/22* (2013.01); *H01M 2/30* (2013.01); *Y02E 60/13* (2013.01); *Y10T 29/417* (2015.01)

(58) Field of Classification Search
None
See application file for complete search history.

(56) References Cited

U.S. PATENT DOCUMENTS

| | | |
|---|---|---|
| 8,263,255 B2 | 9/2012 | Byun et al. |
| 2010/0173178 A1 | 7/2010 | Kim et al. |
| 2011/0052970 A1 | 3/2011 | Kurata et al. |
| 2011/0159353 A1* | 6/2011 | Byun .................... H01M 2/206 429/160 |
| 2012/0288744 A1 | 11/2012 | Guen |
| 2014/0178746 A1 | 6/2014 | Ono |

FOREIGN PATENT DOCUMENTS

| | | |
|---|---|---|
| JP | 2005-285406 A | 10/2005 |
| JP | 2009-80963 A | 4/2009 |
| JP | 2010-33766 A | 2/2010 |
| JP | 2010-161075 A | 7/2010 |
| JP | 2011-071104 A | 4/2011 |
| JP | 2011-77039 A | 4/2011 |

(Continued)

*Primary Examiner* — Sarah A. Slifka
(74) *Attorney, Agent, or Firm* — McGinn I.P. Law Group, PLLC.

(57) ABSTRACT

An energy storage apparatus includes: an energy storage device including a case housing an electrode assembly therein, an external terminal disposed at the case, and a fixing member for fixing the external terminal to the case, the fixing member electrically connecting the electrode assembly to the external terminal; and a bus bar member to be welded to the external terminal, wherein one of the bus bar member and the fixing member has a recess whereas the other of the bus bar member and the fixing member has a projection to be inserted into the recess.

18 Claims, 9 Drawing Sheets

(56) References Cited

FOREIGN PATENT DOCUMENTS

| JP | 2011-138765 A | 7/2011 |
|---|---|---|
| JP | 2012-238562 A | 12/2012 |
| JP | 2013-33661 A | 2/2013 |
| JP | 2014-17081 A | 1/2014 |
| JP | 2014-127277 A | 7/2014 |

* cited by examiner

FIG. 13

ENERGY STORAGE APPARATUS

CROSS-REFERENCE TO RELATED APPLICATIONS

This application claims the benefit of Japanese patent application No. 2013-197535, filed on Sep. 24, 2013, and Japanese patent application No. 2014-163275, filed on Aug. 11, 2014, which are incorporated by reference.

FIELD

The present invention relates to an energy storage apparatus provided with a bus bar member to be welded to an external terminal of an energy storage device.

BACKGROUND

In recent years, an energy storage apparatus provided with an energy storage device such as a battery (e.g., a lithium ion secondary battery or a nickel-metal hydride rechargeable battery) or a capacitor (e.g., an electric dual layer capacitor) has been used as a power source for a vehicle (e.g., an automobile or a motorcycle) or various kinds of equipment (e.g., a cellular phone or a notebook personal computer). The energy storage device for use in the energy storage apparatus of this type includes a case housing an electrode assembly therein and an external terminal disposed on an outer side of the case. The energy storage device is electrically connected to an adjacent energy storage device via a bus bar member to be welded to the external terminal. In this manner, the plurality of energy storage devices are electrically connected to each other, thereby constituting the energy storage apparatus. Moreover, the energy storage apparatus is connected to a motor or a control device, thereby constituting various kinds of equipment. The energy storage apparatus is exemplified by a lithium ion secondary battery module for use in an electric automobile or the like. This is an assembled battery constituted by connecting a plurality of lithium ion secondary batteries in series or parallel via bus bar members.

In an energy storage apparatus of this type, laser welding, for example, has been known as a method for welding an external terminal for an energy storage device to a bus bar member (e.g., JP-A-2013-33661). However, when an external terminal is welded to a bus bar member with a laser beam simply in the state in which the bus bar member is placed on an upper surface of the external terminal, the relative positional relationship between the external terminal and the bus bar member may be varied before or during the welding process. The phenomenon of the variation of the relative positional relationship between the external terminal and the bus bar member happens in various bonding methods such as resistant welding, ultrasonic welding, cold pressure welding, friction stir welding, and bonding with an adhesive agent, in addition to the laser welding

SUMMARY

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

An object of the present invention is to provide an energy storage apparatus capable of maintaining the relative positional relationship between an external terminal and a bus bar member.

According to an aspect of the present invention, an energy storage apparatus includes: an energy storage device including a case housing an electrode assembly therein, an external terminal disposed at the case, and a fixing member for fixing the external terminal to the case, the fixing member electrically connecting the electrode assembly to the external terminal; and a bus bar member to be welded to the external terminal, wherein one of the bus bar member and the fixing member has a recess whereas the other of the bus bar member and the fixing member has a projection to be inserted into the recess.

With this configuration, the relative positional relationship between the external terminal and the bus bar member can be maintained.

BRIEF DESCRIPTION OF THE DRAWINGS

The foregoing and other features of the present invention will become apparent from the following description and drawings of an illustrative embodiment of the invention in which.

DESCRIPTION OF EMBODIMENTS (Outline of Embodiment)

First of all, an explanation will be made on the outline of an energy storage apparatus according to an embodiment.

An energy storage apparatus includes: an energy storage device including a case housing an electrode assembly therein, an external terminal disposed at the case, and a fixing member for fixing the external terminal to the case, the fixing member electrically connecting the electrode assembly to the external terminal; and a bus bar member to be welded to the external terminal, wherein one of the bus bar member and the fixing member has a recess whereas the other of the bus bar member and the fixing member has a projection to be inserted into the recess.

With the energy storage apparatus, the use of the fixing member for fixing the external terminal to the case can restrict the relative movement between the external terminal and the bus bar member.

It is preferable that a clearance is defined between a bottom of the recess and a tip of the projection.

In this case, heat generated at the bus bar member (e.g., heat generation caused by electric charge/discharge) is hardly transmitted to the fixing member.

The fixing member may have a hollow portion. The recess may be the hollow portion.

With the energy storage apparatus, the use of the hollow portion provided for the fixing member can restrict the relative movement between the external terminal and the bus bar member.

The fixing member may be provided with a rivet portion. The projection may be a flange portion formed at the tip of the rivet portion.

With the energy storage apparatus, the use of the flange portion formed at the tip of the rivet portion provided for the fixing member can restrict the relative movement between the external terminal and the bus bar member.

In the energy storage apparatus, the fixing member may be provided with a bolt projecting from the case toward the external terminal and a nut having a hole, into which the bolt is inserted, the recess being the hole.

With the energy storage apparatus, the use of the hole formed at the fixing member can restrict the relative movement between the external terminal and the bus bar member.

In the energy storage apparatus, the fixing member may not project from a surface at which the bus bar member and the external terminal are brought into contact with each other.

With the energy storage apparatus, the exertion of a stress directly on the fixing member caused by a contact or the like from the outside can be restrained.

As a further aspect, the bus bar member may have a lower surface in contact with the external terminal, the clearance being defined between the fixing member and the lower surface.

With the energy storage apparatus, heat generated at the bus bar member (e.g., heat generation caused by electric charge/discharge) is hardly transmitted to the fixing member.

In the energy storage apparatus, the recess may cover the entire projection. With the energy storage apparatus, the relative movement between the external terminal and the bus bar member can be restricted on a plane perpendicular to a direction in which the external terminal and the bus bar member overlap each other.

As a still further aspect, the recess may be a through hole. With the energy storage apparatus, the relative movement between the external terminal and the bus bar member can be restricted by inserting the projection into the through hole.

In the energy storage apparatus, the energy storage device may include a plurality of energy storage devices; the plurality of energy storage devices may be aligned in a first direction; the bus bar member may overlap the external terminal in a second direction perpendicular to the first direction; the recess may have a pair of side walls opposite to each other, as viewed in a third direction perpendicular to the first direction and the second direction; and the projection may have a pair of side portions that are opposed to the pair of side walls, respectively. With the energy storage apparatus, the relative movement between the external terminal and the bus bar member can be restricted in the first direction in which the plurality of energy storage devices are aligned. Consequently, it is possible to restrain relative approach or separation between the adjacent energy storage devices.

The energy storage apparatus may include: an energy storage device including a case housing an electrode assembly therein, an external terminal disposed at the case, and a fixing member for fixing the external terminal to the case, the fixing member electrically connecting the electrode assembly to the external terminal; and a bus bar member to be welded to the external terminal, wherein the bus bar member has a projection, the projection being inserted between the fixing member and the external terminal.

With the energy storage apparatus, the use of the fixing member for fixing the external terminal to the case can restrict the relative movement between the external terminal and the bus bar member.

The energy storage apparatus may include: a plurality of energy storage devices, each having a square case housing an electrode assembly therein, an external terminal disposed on an outer side of the case, and a fixing member for fixing the external terminal to the case, the fixing member electrically connecting the electrode assembly to the external terminal, the energy storage devices being aligned in a first direction; and a bus bar member that is welded between the external terminals of the adjacent energy storage devices out of the plurality of energy storage devices, the bus bar member being superimposed on the external terminals in a second direction perpendicular to the first direction, wherein the fixing member has a rivet portion penetrating the case and the external terminal and a flange portion formed at a tip of the rivet portion; wherein the flange portion has a lower surface extending along the external terminal and a side portion extending from the end of the lower surface, the side portion extending apart from the external terminal; wherein the bus bar member has a lower surface in contact with the external terminal, an upper surface positioned opposite to the lower surface, and side walls facing an entire circumference of the side portion of the flange portion; and wherein the external terminal and the bus bar member have welded portions that are formed over the upper surface of the bus bar member, the lower surface of the bus bar member, and the external terminal.

In the energy storage apparatus, the bus bar member having the side walls covering the entire circumference of the flange portion of the fixing member is provided on a plane perpendicular to the second direction in which the bus bar member and the external terminal overlap each other. Consequently, it is possible to restrict the relative movement between the external terminal and the bus bar member on the plane perpendicular to the second direction (i.e., the first direction and the third direction).

A fabricating method for an energy storage apparatus according to the present specification, the energy storage apparatus including: an energy storage device including a case housing an electrode assembly therein, an external terminal disposed at the case, and a fixing member for fixing the external terminal to the case, the fixing member electrically connecting the electrode assembly to the external terminal; and a bus bar member to be welded to the external terminal of the energy storage device, includes the steps of: positioning the external terminal and the bus bar member; and welding the external terminal to the bus bar member, wherein one of the bus bar member and the fixing member has a recess whereas the other of the bus bar member and the fixing member has a projection, the positioning step being inserting the projection into the recess.

With the fabricating method for the energy storage apparatus according to the present specification, the recess or the projection formed at the fixing member for fixing the external terminal to the case and the bus bar member can be used for positioning the external terminal and the bus bar member.

A battery module which is one embodiment of an energy storage apparatus according to the present invention will be described with reference to the attached drawings. Here, the details of a lithium ion secondary battery module (hereinafter simply referred to as a "battery module") obtained by electrically connecting a plurality of lithium ion secondary batteries (hereinafter simply referred to as "batteries") to each other will be explained in the present embodiments.

<First Embodiment>

Figure 1:
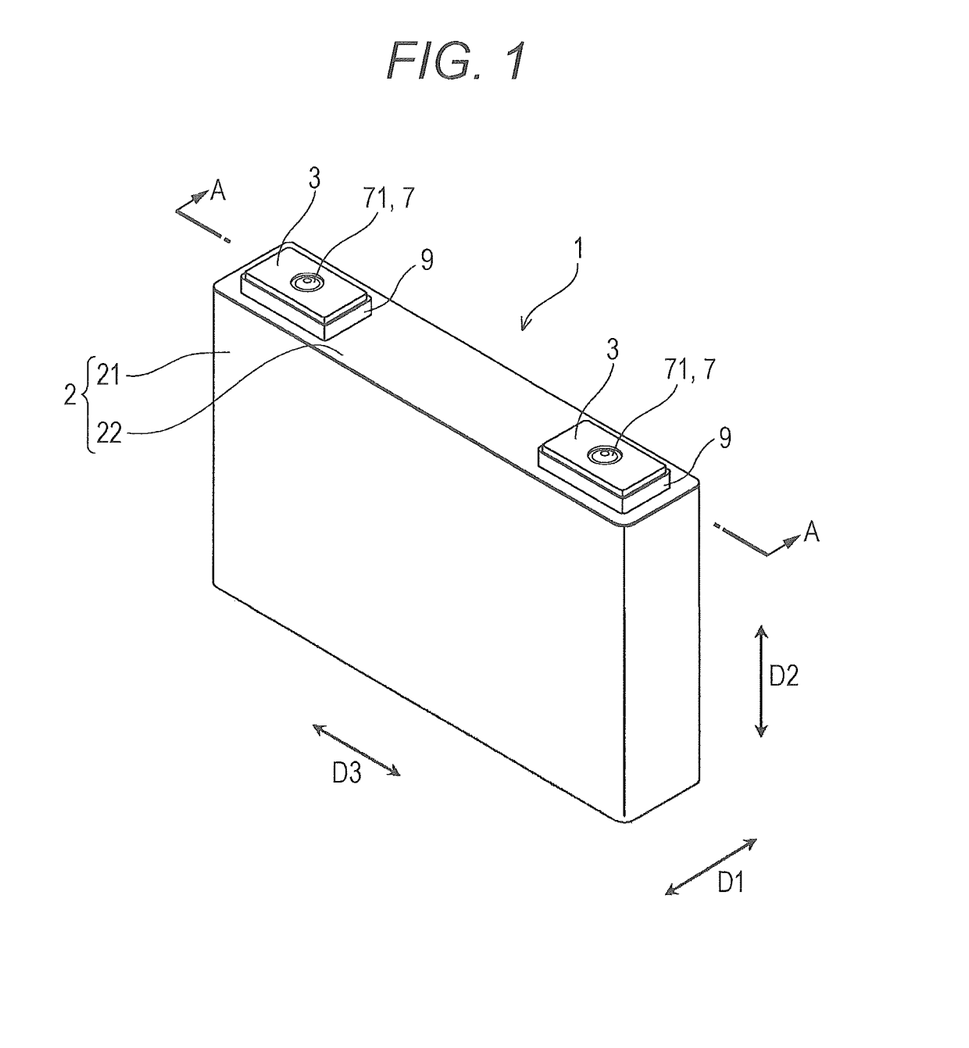
FIG. 1 is a general perspective view illustrating a battery according to a first embodiment of the present invention.

As shown in FIG. 1, a battery 1 of a battery module according to the present embodiment is provided with a case 2 and a pair of external terminals 3 disposed outside of the case. A plurality of batteries 1 are electrically connected to their adjacent batteries 1 via bus bar members 4. The plurality of batteries 1 have the same shape and the same structure, and therefore, the structure of a single battery 1 will be explained below.

Figure 2:
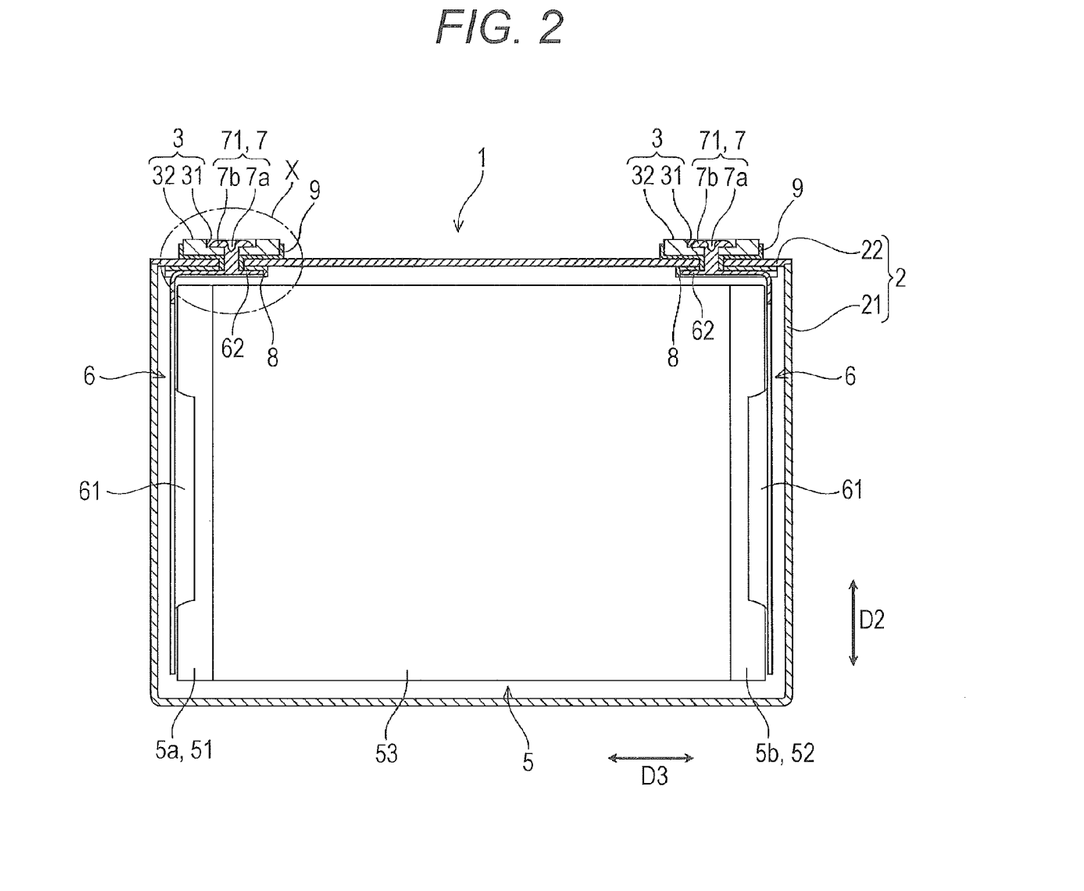
FIG. 2 is a cross-sectional view taken along a line A-A of FIG. 1.

As shown in FIG. 2, the battery 1 includes an electrode assembly 5 to be housed in the case 2. The case 2 is provided with a substantially rectangular case body 21 having an opening at the upper portion thereof whereas a bottom at the lower portion thereof and a lid plate 22 covering the opening. The case body 21 and the lid plate 22 each are made of an aluminum alloy, and further, are joined by welding in the state in which the electrode assembly 5 is housed. The electrode assembly 5 is formed by winding a belt-like positive electrode plate 51 and a belt-like negative electrode plate 52 with an insulating separator 53 interposed therebetween. Hereinafter, "upper" means a side on which the case body 21 has the opening whereas "lower" means a side on which the case body 21 has the bottom, as required.

The positive electrode plate 51 in the present embodiment has a positive electrode foil made of an aluminum alloy and a positive active material layer formed on the positive electrode foil. Moreover, the positive electrode plate 51 has a positive electrode plate exposed portion 5a, on which no positive electrode active material layer is formed at the end thereof. The positive electrode plate exposed portion 5a is joined to, for example, a current collector 6 by ultrasonic welding, and therefore, is electrically connected. The current collector 6 in the present embodiment is made of an aluminum alloy in an L shape, and further, is provided with an electrode assembly connecting portion 61 formed along the positive electrode plate exposed portion 5a and an external terminal connecting portion 62 formed along the lid plate 22. The external terminal connecting portion 62 has a fixing member 7 for fixing the lid plate 22. The fixing member 7 is formed integrally with the external terminal connecting portion 62, and further, has a rivet portion 71 extending from the external terminal connecting portion 62 outward of the case 2. That is to say, the rivet portion 71 is made of an aluminum alloy. The rivet portion 71 is a hollow rivet having a hollow portion 7a at the end thereof.

Figure 3:
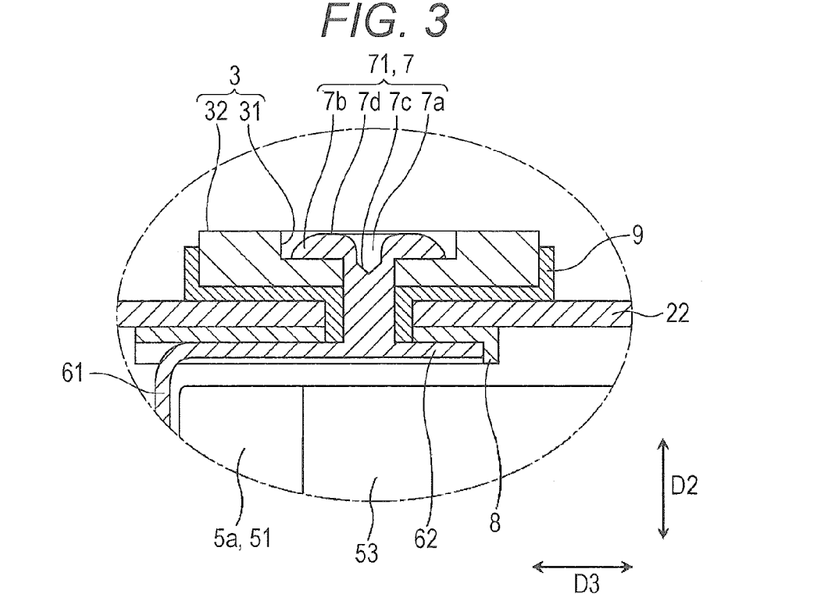
FIG. 3 is an enlarged view illustrating an area X of FIG. 2.

As shown in FIG. 3, an inside insulating member 8 made of an insulating synthetic resin (specifically, polyphenylene sulfide) is interposed between the current collector 6 and the lid plate 22. Moreover, the external terminal 3 made of an aluminum alloy is disposed outside of the lid plate 22. An outside insulating member 9 made of an insulating synthetic resin (specifically, polyphenylene sulfide) is interposed between the lid plate 22 and the external terminal 3. Hence, the current collector 6 is electrically insulated from the lid plate 22, and further, the lid plate 22 is electrically insulated from the external terminal 3.

Through holes, into which the fixing member 7 is inserted, are formed at the lid plate 22, the external terminal 3, the inside insulating member 8, and the outside insulating member 9. The end of the rivet portion 71 is caulked in the state in which the fixing member 7 is inserted into the through holes. The caulking forms a flange portion 7b, at which the end of the rivet portion 71 is enlarged in a flange shape. The lid plate 22, the external terminal 3, the inside insulating member 8, and the outside insulating member 9 are held between the flange portion 7b and the external terminal connecting portion 62 of the current collector 6, to be thus fixed together. In addition, the external terminal 3 and the positive electrode plate 51 are electrically connected to each other via the fixing member 7.

The rivet portion 71 has the hollow portion 7a at the end thereof, and therefore, a stress is liable to be concentrated at the end in caulking. To cope with this, it is possible to readily form the flange portion 7b from the end of the rivet portion 71 with high accuracy. This enables the lid plate 22, the external terminal 3, the inside insulating member 8, and the outside insulating member 9 to be readily held between the flange portion 7b and the external terminal connecting portion 62 of the current collector 6 with high accuracy, resulting in facilitating the fixture of these members, and further, in facilitating the secureness of air-tightness.

The external terminal 3 has a groove 31 containing the flange portion 7b of the rivet portion 71 on the upper surface 32 thereof. The groove 31 is formed by, for example, coining. The flange portion 7b is contained in the groove 31, and therefore, the flange portion 7b can be prevented from projecting from the upper surface 32 of the external terminal 3 in the present embodiment.

The configuration of a negative electrode side is the same as that on the positive electrode side except that the negative electrode plate 52, the current collector 6, and the external terminal 3 are made of a copper alloy. Specifically, the negative electrode plate 52 has a negative electrode exposed portion 5b, on which no negative electrode active material layer is formed at the end thereof. The negative electrode plate exposed portion 5b is joined to the current collector 6 on the negative electrode side by ultrasonic welding. The external terminal 3 on the negative electrode side is disposed outside of the lid plate 22. The lid plate 22 and the external terminal 3 are fixed via the fixing member 7, and further, are electrically connected to each other.

Here, with reference to FIGS. 4 and 5, explanation will be made on a battery module formed by combining the plurality of batteries 1. The plurality of batteries 1 are aligned in a lateral direction of the lid plate 22 (i.e., a direction D1 indicated in FIGS. 1 and 4 (a first direction)). Ten batteries 1 are aligned in the present embodiment. The lateral direction of the lid plate 22 is referred to as an alignment direction, as required.

A pair of batteries 1 adjacent to each other is aligned such that polarities of the external terminals 3 adjacent to each other in the alignment direction are reverse to each other.

The external terminals 3 adjacent to each other in the alignment direction are connected to each other via the bus bar member 4. More specifically, in the adjacent batteries 1, the external terminal 3 on the positive electrode side of one of the batteries 1 and the external terminal 3 on the negative electrode side of the other battery 1 are connected to each other via the bus bar member 4. As a consequence, in the present embodiment, the ten batteries 1 connected in series form a battery module. At this time, the bus bar member 4 is superimposed on the external terminals 3 in a direction (i.e., a direction D2 indicated in FIGS. 1 and 4 (a second direction)) perpendicular to the lateral direction (i.e., the first direction) of the lid plate 22.

Figure 4:
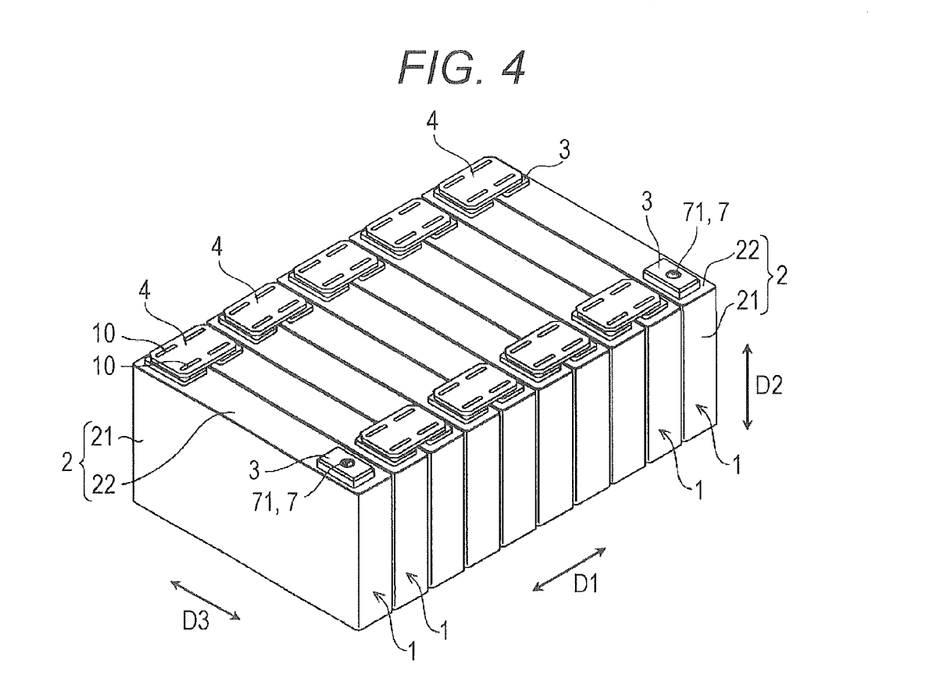
FIG. 4 is a general perspective view illustrating a battery module according to a first embodiment of the present invention.
Figure 5:
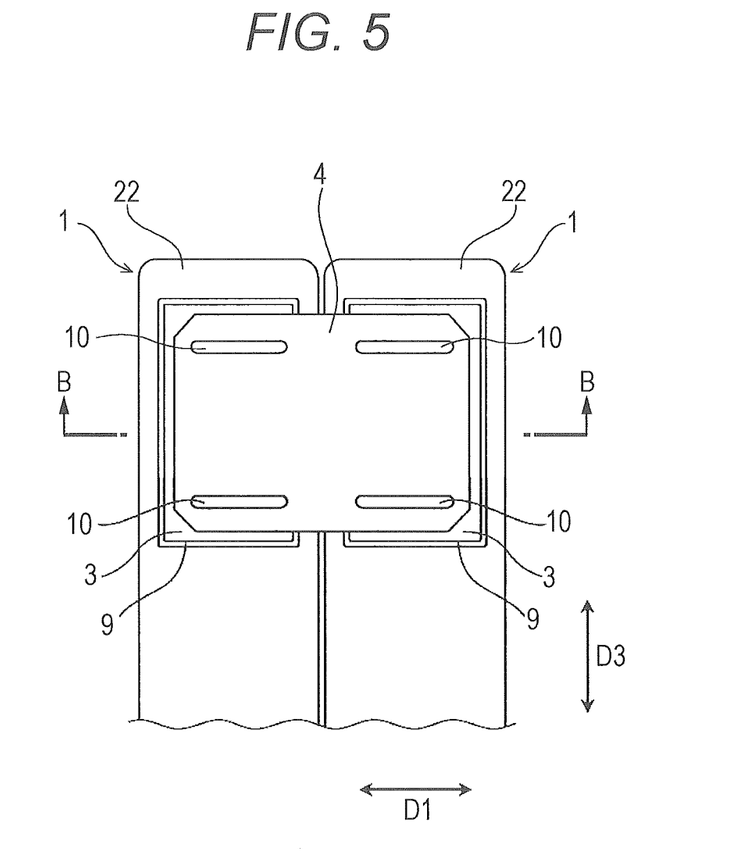
FIG. 5 is a plan view showing, in enlargement, a part of the battery module according to the embodiment.

In one of the batteries 1, one of the paired external terminals 3 is arranged at one end in a longitudinal direction (i.e., a direction D3 indicated in FIGS. 1 and 4 (a third direction)) of the lid plate 22. In the meantime, the other external terminal 3 is arranged at the other end in the longitudinal direction of the lid plate 22. As shown in FIGS. 4 and 5, each of the external terminals 3 is connected to the bus bar member 4. In the present embodiment, the bus bar member 4 is made of an aluminum alloy, and, as viewed on a plane, is a rectangular shape (i.e., a rectangular shape in which a longitudinal direction is in the alignment direction of the plurality of batteries 1) with its four corners chamfered. Moreover, welded portions 10 having a rectangular shape, as viewed on a plane, are formed at the bus bar member 4 and the external terminal 3. One external terminal 3 and one bus bar member 4 have two welded portions 10 having a rectangular shape, as viewed on a plane, in the longitudinal direction of the lid plate 22.

Figure 6:
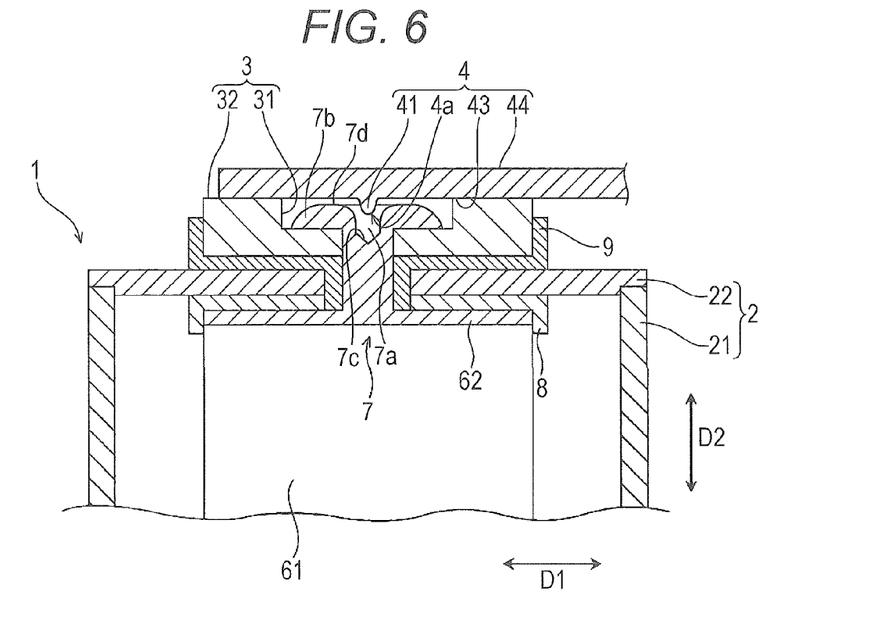
FIG. 6 is a cross-sectional view taken along a line B-B of FIG. 5 without noting an electrode assembly.

Next, explanation will be more specifically made on the welding between the external terminal 3 and the bus bar member 4. As shown in FIG. 6, the bus bar member 4 is placed on the upper surface 32 of the external terminal 3. In other words, the bus bar member 4 is placed on the external terminal 3 in such a manner that the upper surface 32 of the external terminal 3 and a lower surface 43 of the bus bar member 4 are brought into contact with each other. At this time, the bus bar member 4 is placed on the upper surface 32 of the external terminal 3 in the state in which a clearance is defined between the flange 7b and the lower surface 43 of the bus bar member 4.

The bus bar member 4 has a projection 41 on the side of the lower surface 43. The projection 41 is formed into a substantially conical shape having a rounded tip 4a. The projection 41 of the bus bar member 4 is inserted into the hollow portion 7a in the state in which a clearance is defined between a bottom 7c formed backmost of the hollow portion 7a and the tip 4a formed frontmost of the projection 41.

The external terminal 3 and the bus bar member 4 have the welded portions 10, each of which is formed with irradiation of a laser beam from an upper surface 44 of the bus bar member 4 (i.e., a surface opposite to a surface facing the external terminal 3). Each of the welded portions 10 is formed over the upper surface 44 of the bus bar member 4 and the upper surface 32 of the external terminal 3. The external terminal 3 and the bus bar member 4 are electrically and physically connected to each other via the welded portions 10.

Here, the bus bar member 4 is placed on the upper surface 32 of the external terminal 3 in the state in which the projection 41 formed at the bus bar member 4 is inserted into the hollow portion 7a formed at the rivet portion 71. As a consequence, the relative movement between the external terminal 3 and the bus bar member 4 is restricted within a plane in which the external terminal 3 and the bus bar member 4 are brought into contact with each other. Thus, even in the case where vibrations or the like are exerted on the battery 1, the relative positional relationship between the external terminal 3 and the bus bar member 4 is not largely displaced within the plane in which the external terminal 3 and the bus bar member 4 are brought into contact with each other. Moreover, since the welded portions 10 are formed in the state in which the relative movement between the external terminal 3 and the bus bar member 4 is restricted, the relative position between the external terminal 3 and the bus bar member 4 is not largely displaced at the time of the formation of the welded portions 10.

The bus bar member 4 is placed on the upper surface 32 of the external terminal 3 in the state in which the projection 41 formed at the bus bar member 4 is inserted into the hollow portion 7a formed at the rivet portion 71, and therefore, the relative movement between the external terminal 3 and the bus bar member 4 is restricted. In other words, a process in which the projection 41 formed at the bus bar member 4 is inserted into the hollow portion 7a formed at the rivet portion 71 corresponds to a process in which the external terminal 3 and the bus bar member 4 are positioned relatively to each other.

Additionally, the external terminal 3 and the bus bar member 4 are welded to each other with the irradiation of the laser beam from the upper surface 44 of the bus bar member 4 (i.e., the surface opposite to the surface facing the external terminal 3). In other words, a process of the irradiation of the laser beam corresponds to a welding process between the external terminal 3 and the bus bar member 4.

As described above, with the energy storage device according to the present embodiment, the fixing member 7 has a recess formed of the hollow portion 7a, and further, the bus bar member 4 is inserted into the recess formed of the hollow portion 7a and has a projection formed of the projection 41. As a consequence, the use of the recess formed at the fixing member for fixing the external terminal 3 to the case 2 can restrict the relative movement between the external terminal 3 and the bus bar member 4.

Moreover, the clearance is defined between the bottom 7c of the recess formed at the fixing member 7 and the tip 4a of the projection formed at the bus bar member 4. As a consequence, it is possible to, for example, restrain the transmission of heat generated at the bus bar member due to the electric charge or discharge of the energy storage device to the fixing member 7, resulting in restraining of the transmission of the heat to the inside of the energy storage device. In addition, it is possible to prevent the reduction of a compressive stress of the inside insulating member 8 or the outside insulating member 9 that is compressed by the fixing member 7.

Additionally, the recess of the fixing member 7 is the hollow portion 7a. Therefore, the use of the recess such formed as to facilitate the fixture between the external terminal 3 and the case 2 can restrict the relative movement between the external terminal 3 and the bus bar member 4.

In addition, the fixing member 7 is configured in such a manner as not to project from the upper surface 32 of the external terminal 3 that is brought into contact with the lower surface 43 of the bus bar member 4. Consequently, it is possible to restrain the direct exertion of a stress onto the fixing member 7 due to a contact from the outside or the like, resulting in the reduction of a damage on the fixing member. Moreover, the degradation of air-tightness can be reduced.

Furthermore, the bus bar member 4 is placed on the upper surface 32 of the external terminal 3 in the state in which the clearance is defined between the fixing member 7 and the lower surface 43 of the bus bar member 4. As a consequence, it is possible to, for example, restrain the transmission of heat generated at the bus bar member due to the electric charge or discharge of the energy storage device to the fixing member 7, resulting in restraining of the transmission of the heat to the inside of the energy storage device. In addition, it is possible to prevent the reduction of a compressive stress of the inside insulating member 8 or the outside insulating member 9 that is compressed by the fixing member 7.

Furthermore, a fabricating method for the energy storage apparatus according to the present embodiment includes a process for positioning the external terminal 3 and the bus bar member 4. The process signifies a process for inserting the projection formed of the projection 41 into the recess formed of the hollow portion 7a. As a consequence, the use of the recess formed of the hollow portion 7a and the projection formed of the projection 41 can relatively position the external terminal 3 and the bus bar member 4.

<Second Embodiment>

Next, explanation will be made on a battery module of a second embodiment according to the present invention with reference to FIG. 7. The configuration of the battery module of the second embodiment is the same as that of the first embodiment except the configurations of an external terminal 3, a fixing member 7, and a bus bar member 4. Therefore, a description will be given especially of the configurations of the external terminal 3, the fixing member 7, and the bus bar member 4.

Figure 7:
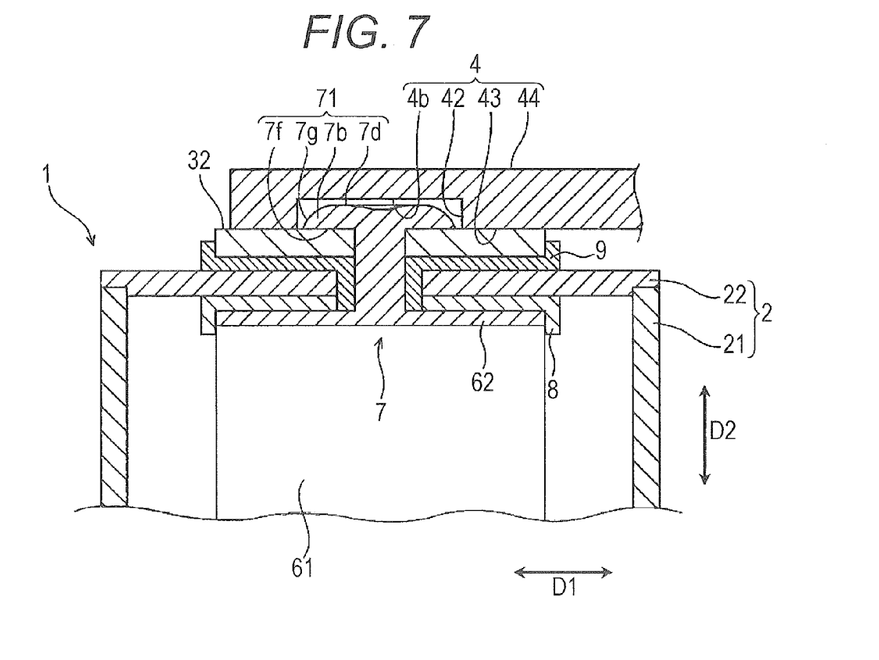
FIG. 7 is a cross-sectional view illustrating parts of a battery module according to a second embodiment of the present invention without noting an electrode assembly.

As shown in FIG. 7, an external terminal connecting portion 62 of a current collector 6 has the fixing member 7 for fixing the external terminal 3 to a lid plate 22. The fixing member 7 is formed integrally with the external terminal connecting portion 62, and further, has a rivet portion 71 extending from the external terminal connecting portion 62 outward of a case 2. The rivet portion 71 is a solid rivet having a solid end.

The end of the rivet portion 71 is caulked in the state in which the fixing member 7 is inserted into through holes formed at the lid plate 22, the external terminal 3, an inside insulating member 8, and an outside insulating member 9. The caulking forms a flange portion 7b, at which the end of the rivet portion 71 is enlarged in a flange shape. The lid plate 22, the external terminal 3, the inside insulating member 8, and the outside insulating member 9 are held between the flange portion 7b and the external terminal connecting portion 62 of the current collector 6, to be thus fixed. In addition, the external terminal 3 and a positive or negative electrode plate 51 or 52 of an electrode assembly 5 are electrically connected to each other via the fixing member 7. At this time, the flange portion 7b projects from an upper surface 32 of the external terminal 3.

Subsequently, the connection between the external terminal 3 and the bus bar member 4 will be more specifically described. As shown in FIG. 7, the bus bar member 4 is placed on the upper surface 32 of the external terminal 3. In other words, the bus bar member 4 is placed on the external terminal 3 in such a manner that the upper surface 32 of the external terminal 3 and a lower surface 43 of the bus bar member 4 are brought into contact with each other. The bus bar member 4 has a step (i.e., a recess) formed of a side wall 42 formed at the lower surface 43 thereof. The step is formed by, for example, coining. The bus bar member 4 is placed on the upper surface 32 of the external terminal 3 in the state in which the step formed of the side wall 42 covers the entire flange portion 7b formed at the rivet portion 71. In other words, the flange portion 7b is inserted into the step of the bus bar member 4. At this time, the step of the bus bar member 4 covers the flange portion 7b with a clearance defined between a bottom 4b formed backmost of the step and a tip 7d formed foremost of the flange portion 7b.

The external terminal 3 and the bus bar member 4 have welded portions 10 formed with the irradiation of a laser beam from an upper surface 44 of the bus bar member 4. Each of the welded portions 10 is formed over the upper surface 44 of the bus bar member 4 and the upper surface 32 of the external terminal 3. The external terminal 3 and the bus bar member 4 are electrically and physically connected to each other via the welded portions 10.

Here, the bus bar member 4 is placed on the upper surface 32 of the external terminal 3 in the state in which the flange 7b formed at the rivet portion 71 is inserted into the step formed at the bus bar member 4. As a consequence, the relative movement between the external terminal 3 and the bus bar member 4 is restricted within a plane in which the external terminal 3 and the bus bar member 4 are brought into contact with each other. Thus, even in the case where vibrations or the like are exerted on a battery 1, the relative positional relationship between the external terminal 3 and the bus bar member 4 is not largely displaced within the plane in which the external terminal 3 and the bus bar member 4 are brought into contact with each other. Moreover, since the welded portions 10 can be formed in the state in which the relative movement between the external terminal 3 and the bus bar member 4 is restricted, the relative positional relationship between the external terminal 3 and the bus bar member 4 is not largely displaced at the time of the formation of the welded portions 10.

Figure 8:
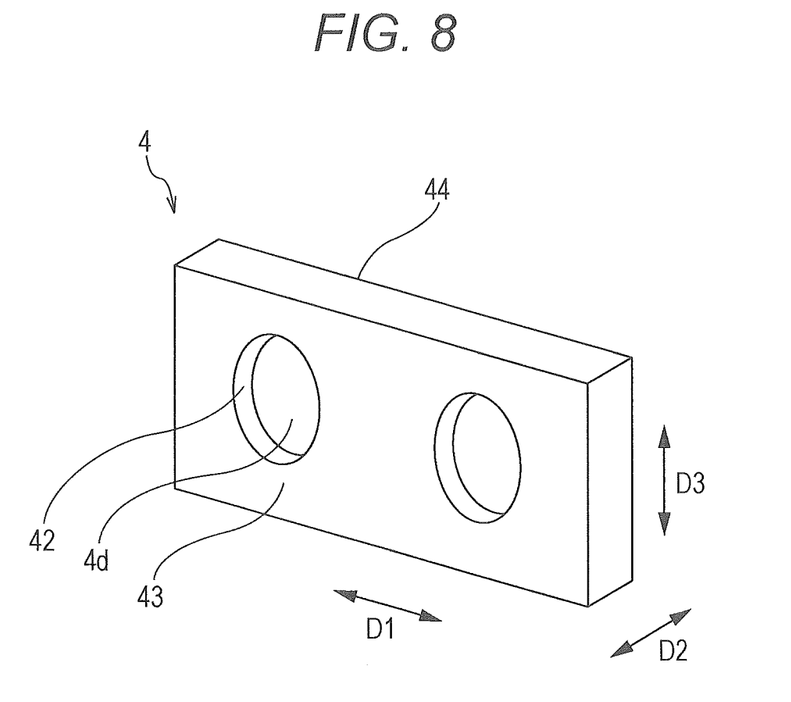
FIG. 8 is a perspective view illustrating a bus bar member according to a second embodiment of the present invention.

As shown in FIG. 8, the bus bar member 4 is formed into a substantially rectangular shape. The bus bar member 4 has the step having the circularly extending side wall 42 and a bottom 4d formed on a part of the lower surface 43. The flange portion 7b of the rivet portion 71 includes a lower surface 7f extending along the external terminal 3 and a side portion 7g that extends from the end of the lower surface 7f and apart from the external terminal 3. The side portion 7g is formed into a circular shape, as viewed in a second direction. The circularly extending side wall 42 covers an entire circumference of the side portion 7g of the flange portion 7b.

A clearance is defined between the side portion 7g of the flange portion 7b and the side wall 42 of the bus bar member 4. The clearance is 0.01 mm or more and 10 mm or less. From the viewpoint of the restriction of the relative positional relationship between the bus bar member 4 and the fixing member 7, the clearance should be preferably 0.1 mm or more and 5 mm or less, and much preferably, 0.2 mm or more and 2 mm or less. If the clearance is small, the bus bar member 4 and the fixing member 7 are liable to interfere with each other when the bus bar member 4 is placed on the upper surface 32 of the external terminal 4. In contrast, if the clearance is large, the external terminal 3 and the bus bar member 4 are liable to be moved relatively to each other.

As shown in FIG. 7, the paired side walls 42 are opposite to each other, as viewed in at least a direction (i.e., a direction D3) perpendicular to an alignment direction of the battery 1 (i.e., a direction D1) and a direction (i.e., a direction D2) in which the bus bar member 4 and the external terminal 3 overlap each other. Moreover, the paired side walls 42 face the paired side portions 7g of the flange portion 7b (i.e., the ends in the direction D1), respectively.

As described above, with an energy storage device according to the present embodiment, the bus bar member 4 has the step (i.e., the recess) formed of the side walls 42, and further, the fixing member 7 is inserted into the recess formed at the bus bar member 4 and includes the projection formed of the flange portion 7b. As a consequence, the use of the projection formed at the fixing member 7 for fixing the external terminal 3 to the case 2 can restrict the relative movement between the external terminal 3 and the bus bar member 4.

Moreover, the clearance is defined between the bottom 4b of the recess formed at the bus bar member 4 and the tip 7d of the projection formed at the fixing member 7. As a consequence, it is possible to, for example, restrain the transmission of heat generated at the bus bar due to the electric charge or discharge of the energy storage device to the fixing member 7, resulting in restraining of the transmission of the heat to the inside of the energy storage device. In addition, it is possible to prevent the reduction of a compressive stress of the inside insulating member 8 or the outside insulating member 9 that is compressed by the fixing member 7.

Additionally, the projection formed at the fixing member 7 is the flange portion 7b formed at the tip of the rivet portion 71. Therefore, the use of the projection such formed as to fix the external terminal 3 to the case 2 can restrict the relative movement between the external terminal 3 and the bus bar member 4.

Furthermore, a fabricating method for the energy storage apparatus according to the present embodiment includes a process for positioning the external terminal 3 and the bus bar member 4. The process signifies a process for inserting the projection formed of the flange portion 7b into the step (i.e., the recess) formed of the side walls 42 of the bus bar member 4. As a consequence, the use of the projection formed of the flange portion 7b and the step (i.e., the recess) formed of the side walls 42 of the bus bar member 4 can relatively position the external terminal 3 and the bus bar member 4.

<Third Embodiment>

Next, explanation will be made on a battery module of a third embodiment according to the present invention with reference to FIG. 9. The configuration of the battery module of the third embodiment is the same as that of the second embodiment except the configurations of an external terminal 3, a fixing member 7, and a bus bar member 4. Therefore, a description will be given especially of the configurations of the external terminal 3, the fixing member 7, and the bus bar member 4.

Figure 9:
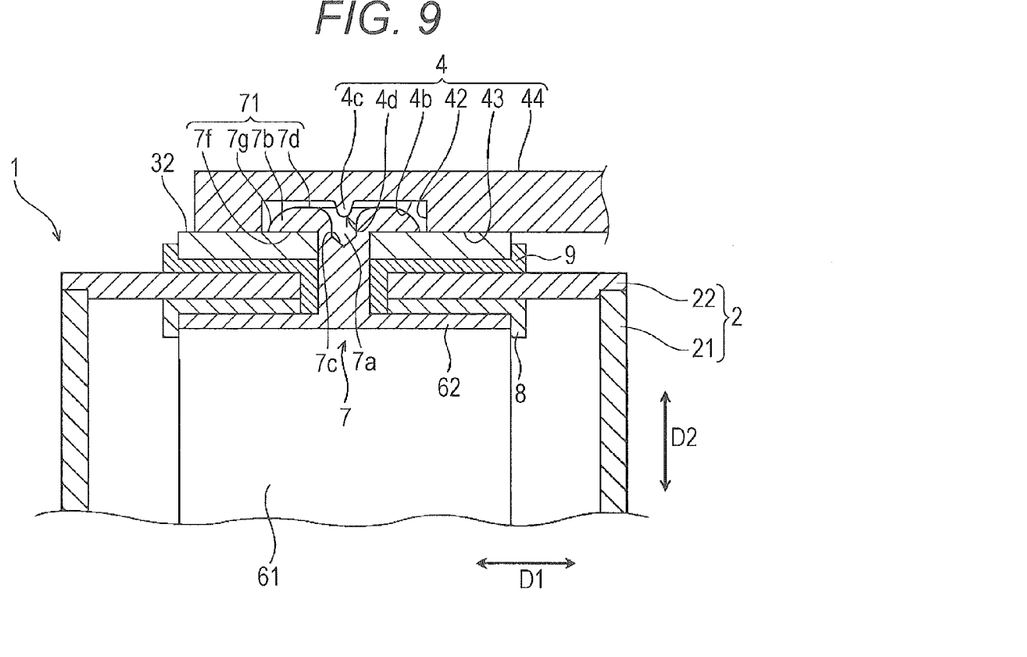
FIG. 9 is a cross-sectional view illustrating parts of a battery module according to a third embodiment of the present invention without noting an electrode assembly.

As shown in FIG. 9, an external terminal connecting portion 62 of a current collector 6 includes the fixing member 7 for fixing the external terminal 3 to a lid plate 22. The fixing member 7 is formed integrally with the external terminal connecting portion 62, and further, has a rivet portion 71 extending from the external terminal connecting portion 62 outward of a case 2. The rivet portion 71 is a hollow rivet having a hollow portion 7a at the end thereof.

The end of the rivet portion 71 is caulked in the state in which the fixing member 7 is inserted into through holes formed at the lid plate 22, the external terminal 3, an inside insulating member 8, and an outside insulating member 9. The caulking forms a flange portion 7b, at which the end of the rivet portion 71 is enlarged in a flange shape. The lid plate 22, the external terminal 3, the inside insulating member 8, and the outside insulating member 9 are held between the flange portion 7b and the external terminal connecting portion 62 of the current collector 6, to be thus fixed. In addition, the external terminal 3 and a positive or negative electrode plate 51 or 52 of an electrode assembly 5 are electrically connected to each other via the fixing member 7. At this time, the flange portion 7b projects from an upper surface 32 of the external terminal 3.

The rivet portion 71 has the hollow portion 7a at the end thereof, and therefore, a stress is liable to be concentrated at the end in caulking. To cope with this, it is possible to readily form the flange portion 7b from the end of the rivet portion 71 with high accuracy. This enables the lid plate 22, the external terminal 3, the inside insulating member 8, and the outside insulating member 9 to be readily held between the flange portion 7b and the external terminal connecting portion 62 of the current collector 6 with high accuracy, resulting in the ready fixture of these members, and further, in the ready secureness of air-tightness.

Subsequently, the welding between the external terminal 3 and the bus bar member 4 will be more specifically described. As shown in FIG. 9, the bus bar member 4 is placed on the upper surface 32 of the external terminal 3. In other words, the bus bar member 4 is placed on the external terminal 3 in such a manner that the upper surface 32 of the external terminal 3 and a lower surface 43 of the bus bar member 4 are brought into contact with each other. The bus bar member 4 has a step (i.e., a recess) formed of a side wall 42 formed at the lower surface 43 thereof. The step is formed by, for example, coining. The bus bar member 4 is placed on the upper surface 32 of the external terminal 3 in the state in which the step covers the entire flange portion 7b formed at the rivet portion 71. In other words, the flange portion 7b is inserted into the step of the bus bar member 4. At this time, the step of the bus bar member 4 covers the flange portion 7b with a clearance defined between a bottom 4b formed backmost of the step and a tip 7d formed foremost of the flange portion 7b.

The bus bar member 4 has a projection 4c at the center of the step. The projection 4c is formed into a substantially conical shape having a rounded tip 4d. The projection 4c of the bus bar member 4 is inserted into the hollow portion 7a in the state in which a clearance is defined between a bottom 7c formed backmost of the hollow portion 7a and the tip 4d formed frontmost of the projection 4c.

The external terminal 3 and the bus bar member 4 have welded portions 10, each of which is formed with the irradiation of a laser beam from the upper surface 32 of the bus bar member 4. Each of the welded portions 10 is formed over the upper surface 44 of the bus bar member 4 and the upper surface 32 of the external terminal 3. The external terminal 3 and the bus bar member 4 are electrically and physically connected to each other via the welded portions 10.

Here, the bus bar member 4 is placed on the upper surface 32 of the external terminal 3 in the state in which the flange portion 7b formed at the rivet portion 71 is inserted into the step formed at the bus bar member 4. Moreover, the bus bar member 4 is placed on the upper surface 32 of the external terminal 3 in the state in which the projection 4c formed at the bus bar member 4 is inserted into the hollow portion 7a formed at the rivet portion 71. As a consequence, the relative movement between the external terminal 3 and the bus bar member 4 is restricted within a plane in which the external terminal 3 and the bus bar member 4 are brought into contact with each other. Thus, even in the case where vibrations or the like are exerted on a battery 1, the relative positional relationship between the external terminal 3 and the bus bar member 4 is not largely displaced within the plane in which the external terminal 3 and the bus bar member 4 are brought into contact with each other. Moreover, since the welded portions 10 are formed in the state in which the relative movement between the external terminal 3 and the bus bar member 4 is restricted, the relative positional relationship between the external terminal 3 and the bus bar member 4 is not largely displaced at the time of the formation of the welded portions 10.

As described above, with the energy storage device according to the present embodiment, the fixing member 7 has a recess formed of the hollow portion 7a, and further, the bus bar member 4 is inserted into the recess formed of the hollow portion 7a and has a projection formed of the projection 4c. As a consequence, the use of the recess formed at the fixing member 7 for fixing the external terminal 3 to the case 2 can restrict the relative movement between the external terminal 3 and the bus bar member 4.

Furthermore, the bus bar member 4 has the step (i.e., the recess) formed of the side walls 42, and further, the fixing member 7 is inserted into the step (i.e., the recess) formed at the bus bar member 4 and includes the projection formed of the flange portion 7b. As a consequence, the use of the projection formed at the fixing member 7 for fixing the external terminal 3 to the case 2 can more effectively restrict the relative movement between the external terminal 3 and the bus bar member 4.

Moreover, the clearance is defined between the bottom 7c of the recess formed at the fixing member 7 and the tip 4d of the projection formed at the bus bar member 4. As a consequence, it is possible to, for example, restrain the transmission of heat generated at the bus bar member due to the electric charge or discharge of the energy storage device to the fixing member 7.

Moreover, the clearance is defined between the bottom 4b of the recess formed at the bus bar member 4 and the tip 7d of the projection formed at the fixing member 7. As a consequence, it is possible to, for example, more effectively restrain the transmission of the heat generated at the bus bar member due to the electric charge or discharge of the energy storage device to the fixing member 7.

Additionally, the recess formed at the fixing member 7 is the hollow portion 7a. Therefore, the use of the recess such formed as to facilitate the fixture between the external terminal 3 and the case 2 can restrict the relative movement between the external terminal 3 and the bus bar member 4.

In addition, the projection formed at the fixing member 7 is the flange portion 7b formed at the tip of the rivet portion 71. Therefore, the use of the projection such formed as to fix the external terminal 3 to the case 2 can restrict the relative movement between the external terminal 3 and the bus bar member 4.

Furthermore, a fabricating method for the energy storage apparatus according to the present embodiment includes a process for positioning the external terminal 3 and the bus bar member 4. The process signifies a process for inserting the projection formed of the projection 4c into the recess formed of the hollow portion 7a, and further, inserting the projection formed of the flange portion 7b into the step (i.e., the recess) formed of the side walls 42 of the bus bar member 4. As a consequence, the use of the recess formed of the hollow portion 7a and the projection formed of the projection 4c can relatively position the external terminal 3 and the bus bar member 4, and further, the use of the step (i.e., the recess) formed of the side walls 42 of the bus bar member 4 and the projection formed of the flange portion 7b can relatively position the external terminal 3 and the bus bar member 4.

<Other Embodiments>

Incidentally, the energy storage apparatus according to the present invention is not limited to the above-described embodiments. It is to be understood that various modifications should be made within the scope without departing from the subject matters of the present invention. Moreover, it is to be understood that configurations or methods according to modifications described below should be optionally and selectively adopted in the configurations or methods according to the embodiments.

Although the fixing member 7 is provided with the rivet portion 71 in the embodiments, the present invention is not limited to this. For example, the fixing member 7 may be provided with a bolt 72 projecting from the case 2 toward the external terminal 3 and a nut 73 having a hole 7e, into which the bolt 72 is to be inserted.

Figure 10:
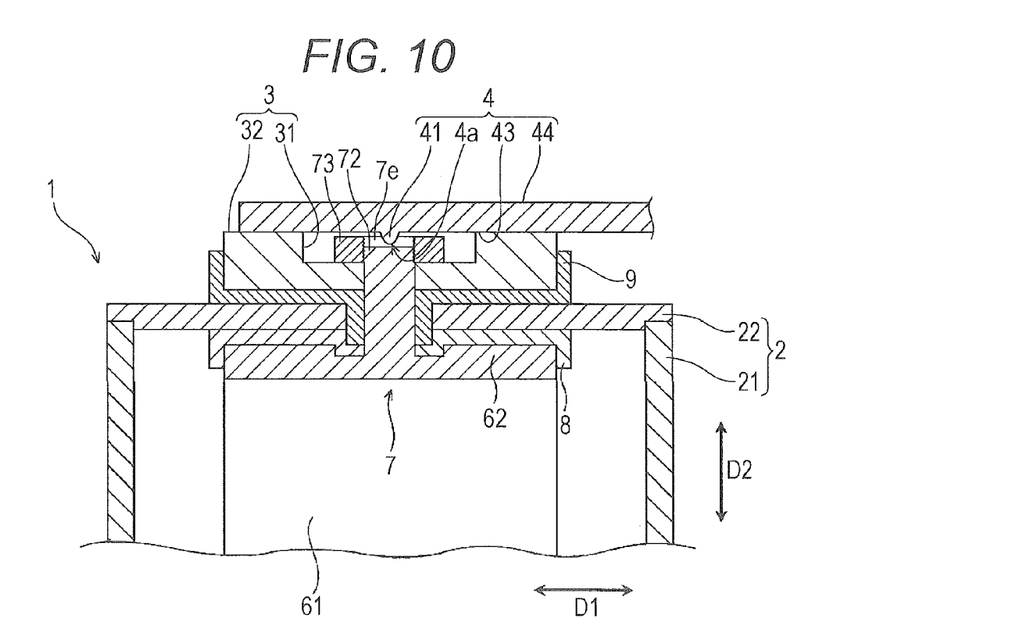
FIG. 10 is a cross-sectional view illustrating parts of a battery module according to another embodiment of the present invention without noting an electrode assembly.

Specifically, as shown in FIG. 10, the bolt 72 projecting toward the external terminal 3 is inserted into the hole 7e formed at the nut 73, followed by caulking, in the fixing member 7. The caulking of the nut 73 enables the lid plate 22, the external terminal 3, the inside insulating member 8, and the outside insulating member 9 to be held, thereby fixing these members. In this case, the projection 41 formed on the side of the lower surface 43 of the bus bar member 4 may be inserted into the hole 7e formed at the nut 73.

Figure 11:
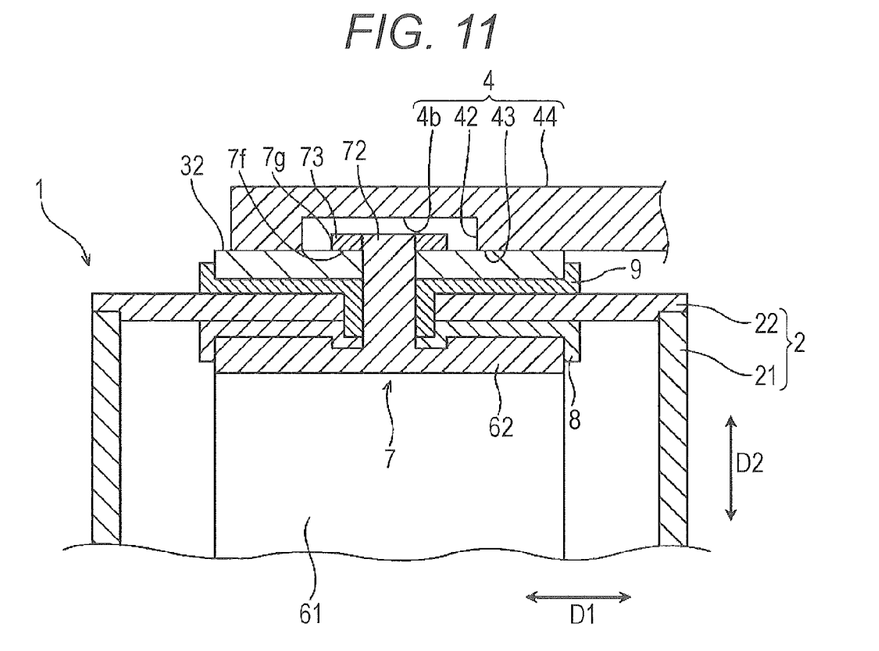
FIG. 11 is a cross-sectional view illustrating parts of a battery module according to a further embodiment of the present invention without noting an electrode assembly.

Alternatively, as shown in FIG. 11, the nut 73 may project from the upper surface 32 of the external terminal 3. The bolt 72 may project from the hole 7e of the nut 73. In this case, the bus bar member 4 may be provided with a step, into which the entire nut 73 is inserted.

Although the current collector 6 and the fixing member 7 are formed integrally with each other in the embodiments, the present invention is not limited to this. For example, the current collector 6 and the fixing member 7 are formed independently of each other, and then, are connected to each other by welding or caulking.

Although the bus bar member 4 is made of the aluminum alloy in the embodiments, the present invention is not limited to this. For example, the bus bar member 4 may be made of metal material such as a copper alloy or nickel. Moreover, the bus bar member 4 may be made of a material plated with metal. It is to be understood that the material should not be limited to alloys but may be pure metal material.

Although the external terminal 3 and the bus bar member 4 are welded to each other by laser welding in the embodiments, the present invention is not limited to this. For example, the external terminal and the bus bar member may be optionally welded by resistant welding, ultrasonic welding, cold pressure welding, friction stir welding, and welding with an adhesive agent.

Although the case body 21 and the lid plate 22 are made of the aluminum alloy in the embodiments, the present invention is not limited to this. For example, they may be made of metal material such as SUS or nickel. In addition, they may be made of resin material such as PPS (polyphenylene sulfide) or PP (polypropylene).

Although the inside insulating member 8 is interposed between the current collector 6 and the lid plate 22 whereas the outside insulating member 9 is interposed between the lid plate 22 and the external terminal 3 in the embodiments, the present invention is not limited to this. For example, in the case where the lid plate 22 is made of insulating material such as PPS or PP, no inside insulating member 8 and no outside insulating member 9 may be disposed. Alternatively, in the case where the lid plate 22 is connected onto either one of the positive electrode side and the negative electrode side, no inside insulating member 8 and no outside insulating member 9 may be disposed.

Although the electrode assembly 5 having the positive electrode plate 51 and the negative electrode plate 52 wound therearound with the insulating separator 53 interposed therebetween is used in the embodiments, the present invention is not limited to this. For example, a plurality of positive electrode plates and a plurality of negative electrode plates may be laminated via separators, thus forming an electrode assembly. Alternatively, any one of a positive electrode plate, a negative electrode plate, and a separator may be wound, and then, the other two members may be laminated therebetween, thus forming an electrode assembly.

Although the case 2 of the battery 1 is formed into the square shape in the embodiments, the present invention is not limited to this. For example, a case having a rectangular shape, as viewed from the outside, and a case having a columnar shape, as viewed from the outside may be used.

Although the lithium ion secondary battery is used as the energy storage device in the above-described embodiments, the present invention is not limited to this. For example, a secondary battery such as a nickel-metal hydride rechargeable battery or a nickel-cadmium rechargeable battery may be used as an energy storage device. Alternatively, a primary battery or a capacitor such as an electric double layer capacitor may be used. Moreover, a plurality of kinds of energy storage devices may be combined with each other. Other than that, the voltage or capacity of an energy storage device is arbitrary.

Although the energy storage apparatus is the battery module using the plurality of batteries 1 in the above-described embodiments, the present invention is not limited to this. For example, an energy storage apparatus may be constituted by combining one battery with an outside circuit for a motor or a controller. In this case, any energy storage apparatuses are sufficient as long as the energy storage apparatus is provided with a bus bar member for partly connecting an external terminal provided at one battery to the outside circuit. Moreover, the energy storage apparatus may be provided with a plurality of batteries and outside circuits.

Figure 12:
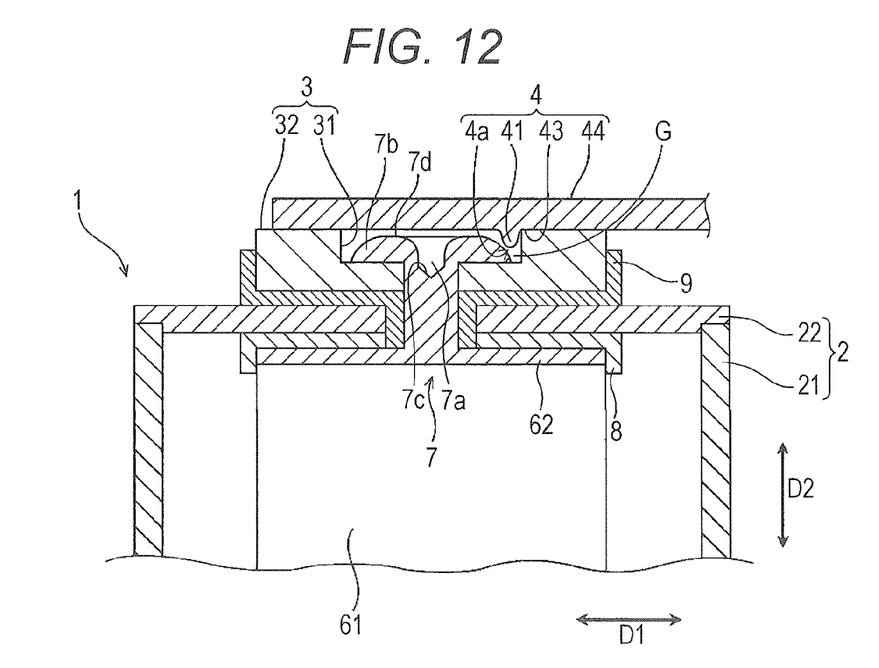
FIG. 12 is a cross-sectional view illustrating parts of a battery module according to a still further embodiment of the present invention without noting an electrode assembly.

Although the projection 41 formed at the bus bar member 4 is inserted into the hollow portion 7a formed at the rivet portion 71 of the fixing member 7 in the energy storage apparatus in the first embodiment, the present invention is not limited to this. As shown in FIG. 12, a clearance G may be defined between a groove 31 formed at the external terminal 3 and the fixing member 7, and then, the projection 41 formed at the bus bar member 4 may be inserted into the clearance G. In this case, it is preferable that a clearance should be defined between the tip 4d of the projection 41 and the external terminal 3 or between the tip 4d of the projection 41 and the fixing member 7.

Figure 13:
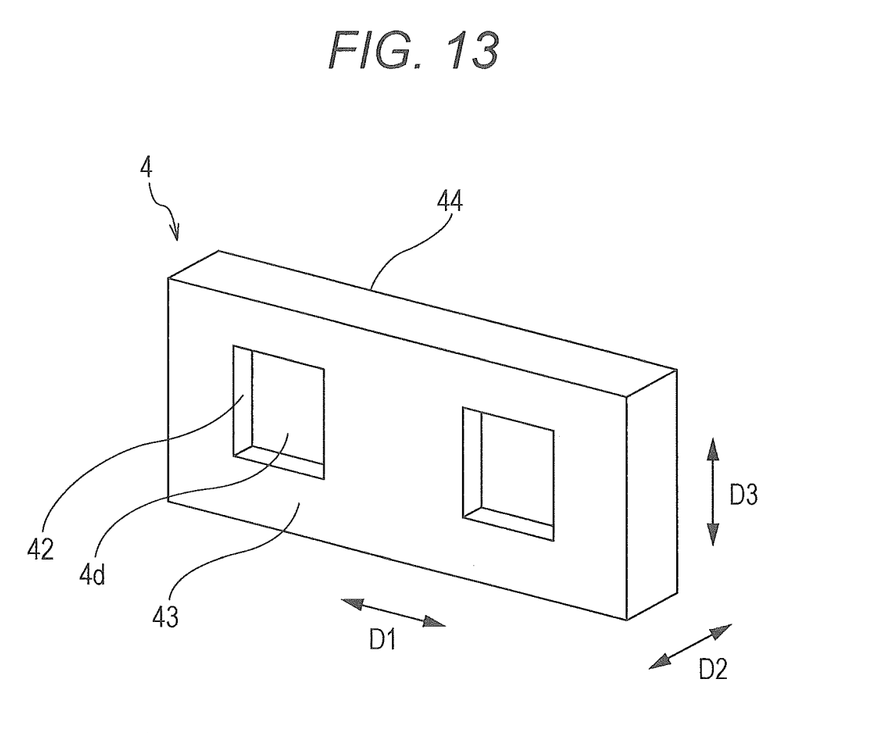
FIG. 13 is a perspective view illustrating a bus bar member according to a still further embodiment of the present invention.

Although the circularly extending side wall 42 and the recess having the bottom 4d are formed at a part of the lower surface 43 of the bus bar member 4 in the energy storage apparatus in the second embodiment, the present invention is not limited to this. As shown in FIG. 13, a recess having a rectangularly extending side wall 42 and the bottom 4d is formed at a part of the lower surface 43 of a bus bar member 4. In this case, it is preferable that the rectangularly extending side wall 42 should cover the entire circumference of the flange portion 7b formed at the rivet portion 71. In this case, it is preferable that the side wall 42 should face a side portion 7g of the flange portion 7b (i.e., an end in the direction D1) in the alignment direction of the batteries 1.

Although the bus bar member 4 having the bottom 4b is used in the energy storage apparatuses in the second and third embodiments, the present invention is not limited to this. For example, a bus bar member 4 may have a side wall 42 without any bottom 4b. More specifically, a bus bar member 4 having a through hole may be used, and then, the fixing member 7 may be inserted into the through hole.

Although the clearance is defined between the side portion 4g of the flange portion 7b and the side wall 42 of the bus bar member 4 in the energy storage apparatuses in the second and third embodiments, the present invention is not limited to this. For example, the side portion 4g of the flange portion 7b and the side wall 42 of the bus bar member 4 may be brought into contact with each other.

What is claimed is:

1. An energy storage apparatus comprising:
   an energy storage device including:
      a case housing an electrode assembly therein;
      an external terminal disposed at the case; and
      a fixing member for fixing the external terminal to the case, the fixing member electrically connecting the electrode assembly to the external terminal; and
   a bus bar member to be welded to the external terminal,
   wherein one of the bus bar member and the fixing member has a recess,
   wherein the other of the bus bar member and the fixing member has a projection to be inserted into the recess, and
   wherein a clearance is defined between a bottom of the recess and a tip of the projection.

2. The energy storage apparatus according to claim 1, wherein the fixing member has a hollow portion, and the recess is the hollow portion.

3. The energy storage apparatus according to claim 1, wherein the fixing member is provided with a rivet portion, and the projection is a flange portion formed at a tip of the rivet portion.

4. The energy storage apparatus according to claim 1, wherein the fixing member is provided with a bolt projecting from the case toward the external terminal and a nut having a hole, into which the bolt is inserted,
   the recess being the hole.

5. The energy storage apparatus according to claim 1, wherein the fixing member is provided with a bolt projecting from the case toward the external terminal and a nut having a hole, into which the bolt is inserted,
   the projection being the nut.

6. The energy storage apparatus according to claim 1, wherein the fixing member does not project from a surface on which the bus bar member and the external terminal are brought into contact with each other.

7. The energy storage apparatus according to claim 1, wherein the bus bar member has a lower surface in contact with the external terminal,
   a clearance being defined between the fixing member and the lower surface.

8. The energy storage apparatus according to claim 1, wherein the recess covers an entirety of the projection.

9. The energy storage apparatus according to claim 1, wherein the recess is a through hole.

10. The energy storage apparatus according to claim 1, wherein the energy storage device includes a plurality of energy storage devices;
   the plurality of energy storage devices are aligned in a first direction;
   the bus bar member overlaps the external terminal in a second direction perpendicular to the first direction;
   the recess has a pair of side walls opposite to each other, as viewed in a third direction perpendicular to the first direction and the second direction; and
   the projection has a pair of side portions that are opposed to the pair of side walls, respectively.

11. An energy storage apparatus comprising:
a plurality of energy storage devices, each having a case housing an electrode assembly therein, an external terminal disposed on an outer side of the case, and a fixing member for fixing the external terminal to the case, the fixing member electrically connecting the electrode assembly to the external terminal, the energy storage devices being aligned in a first direction; and
a bus bar member that is welded between the external terminals of the adjacent energy storage devices out of the plurality of energy storage devices, the bus bar member being superimposed on the external terminals in a second direction perpendicular to the first direction,
wherein the fixing member has a rivet portion penetrating the case and the external terminal and a flange portion formed at the tip of the rivet portion,
wherein the flange portion has a lower surface extending along the external terminal and a side portion extending from an end of the lower surface, the side portion extending apart from the external terminal,
wherein the bus bar member has a lower surface in contact with the external terminal, an upper surface positioned opposite to the lower surface, and side walls facing an entire circumference of the side portion of the flange portion, and
wherein the external terminal and the bus bar member have welded portions that are formed over the upper surface of the bus bar member, the lower surface of the bus bar member, and the external terminal.

12. A fabricating method for an energy storage apparatus including an energy storage device including a case housing an electrode assembly therein, an external terminal disposed at the case, and a fixing member for fixing the external terminal to the case, the fixing member electrically connecting the electrode assembly to the external terminal, and a bus bar member to be welded to the external terminal of the energy storage device, the method comprising:
positioning the external terminal and the bus bar member; and
welding the external terminal to the bus bar member,
wherein one of the bus bar member and the fixing member has a recess, and the other of the bus bar member and the fixing member has a projection,
wherein the positioning of the external terminal and the bus bar member comprises inserting the projection into the recess, and
wherein a clearance is defined between a bottom of the recess and a tip of the projection.

13. An energy storage apparatus comprising:
an energy storage device including a case housing an electrode assembly therein, an external terminal disposed at the case, and a fixing member for fixing the external terminal to the case, the fixing member electrically connecting the electrode assembly to the external terminal; and
a bus bar member to be welded to the external terminal,
wherein the bus bar member includes a recess, and
wherein the fixing member includes a projection to be inserted into the recess.

14. The energy storage apparatus according to claim 13, wherein the recess comprises a through hole.

15. The energy storage apparatus according to claim 13, wherein the projection of the fixing member comprises an other recess, and the recess of the bus bar member comprises an other projection, and the other projection is inserted into the other recess.

16. The energy storage apparatus according to claim 13, wherein the external terminal comprises a through hole, and the fixing member is formed in the through hole, and
wherein the bus bar member is welded to the external terminal on opposing sides of the through hole.

17. The energy storage apparatus according to claim 13, wherein the external terminal has a rectangular shape and the bus bar member has a rectangular shape, and
wherein a long side of the bus bar member is arranged in a first direction and a long side of the external terminal is arranged in a second direction perpendicular to the first direction.

18. The energy storage apparatus according to claim 13, wherein the energy storage device further comprises a current collector connected to the electrode assembly, and
wherein the fixing member is integrally formed with the current collector.

* * * * *